June 5, 1934.  G. T. PFLEGER  1,961,387
VENTILATED MOTOR
Filed Aug. 19, 1930  2 Sheets-Sheet 1
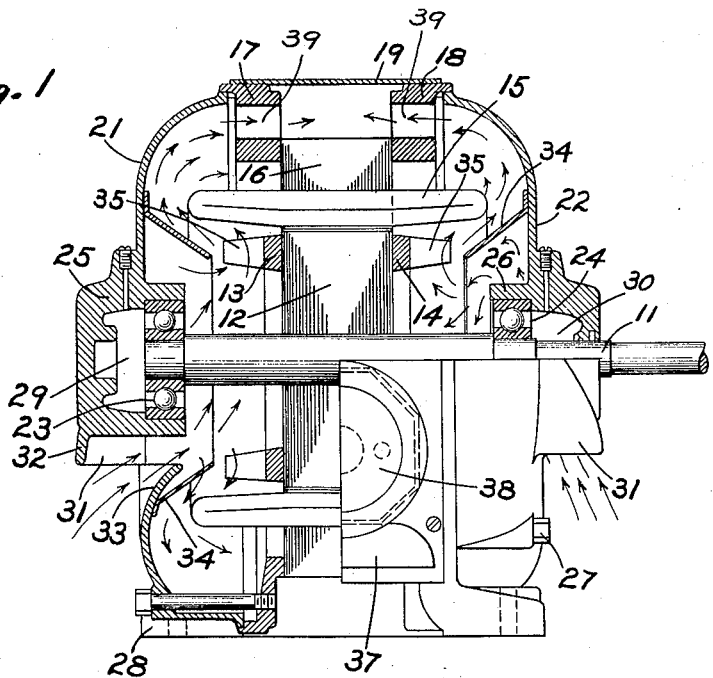
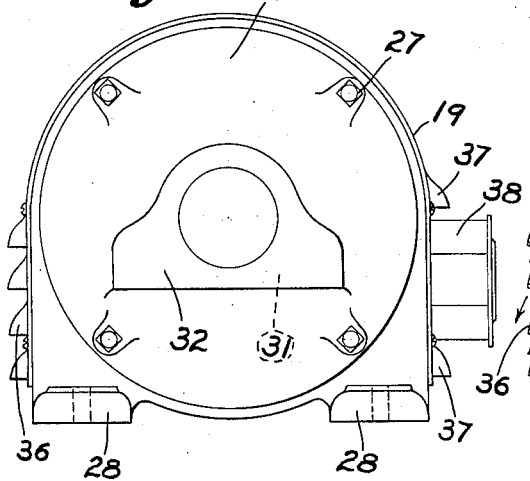
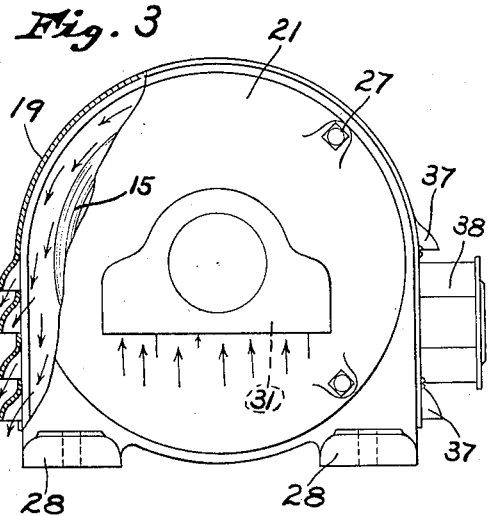
Inventor
George T. Pfleger
by John Flam
Attorney

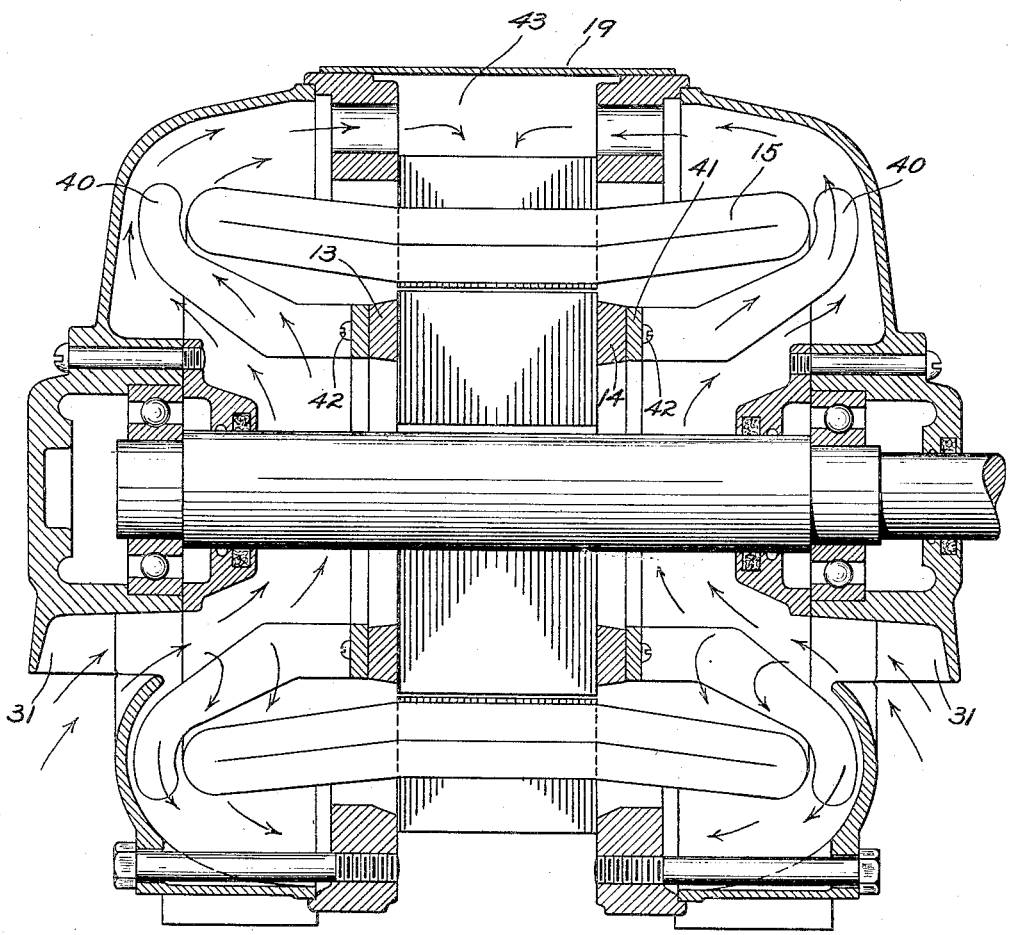

Patented June 5, 1934

1,961,387

UNITED STATES PATENT OFFICE 1,961,387

VENTILATED MOTOR

George T. Pfleger, Los Angeles, Calif., assignor to U. S. Electrical Manufacturing Company, Los Angeles, Calif., a corporation of California Application August 19, 1930, Serial No. 476,297

4 Claims. (Cl. 172—36)

This invention relates to an electric motor, and especially to one having a horizontal axis, and that is arranged to be ventilated or cooled, as by a stream of air that passes through the casing of the motor.

It is one of the objects of my invention to provide a weather proof motor that can be used out of doors, and yet which provides for ingress and egress of the ventilating air without danger of foreign matter entering into the motor casing.

It is still another object of my invention to provide for ventilation of the motor by the aid of the end frames that are provided with downwardly directed bell mouths for the entry of air, the end frames being otherwise entirely closed. The egress of the air can be provided for through openings at the sides of the motor or near the bottom thereof.

It is still another object of my invention to provide a compact and simple ventilating scheme for horizontal electric motors, in which the ventilating air proceeds generally not only in an axial direction, but also through a tortuous path.

It is still another object of my invention to provide a compact and simple structure for a ventilated motor.

My invention possesses many other advantages, and has other objects which may be made more easily apparent from a consideration of one embodiment of my invention. For this purpose I have shown a form in the drawings accompanying and forming part of the present specification. I shall now proceed to describe this form in detail, which illustrates the general principles of my invention; but it is to be understood that this detailed description is not to be taken in a limiting sense, since the scope of my invention is best defined by the appended claims.

Referring to the drawings:

Figure 1 is a view mainly in section of a motor embodying my invention;

Fig. 2 is an end view thereof;

Fig. 3 is a view similar to Fig. 2, but with part of the frame broken away to illustrate the course of the ventilating air stream; and Fig. 4 is a sectional view of a motor of slightly modified construction, but yet embodying my invention.

The motor includes in general a shaft 11 upon which is mounted the rotor 12 of the motor. In the present instance an induction motor is indicated; but, of course, it is to be understood that my invention can be applied to other types of motors. Thus, in this instance, the rotor member 12 can comprise a stack of laminations held together as by the end rings 13, 14, between which can extend a connecting squirrel cage winding.

The stator winding is shown as comprising a series of coils 15 encompassing the rotor 12 and supported in a stack of laminations 16. These laminations are held together by any appropriate fastening devices, such as the clamping rings 17, 18. In order entirely to inclose the stack of laminations 16, a casing member 19 is indicated which can be made of sheet metal, and extends between the clamping members 17 and 18, and to which the member 19 can be fastened in any appropriate manner. Fastening elements can pass through the rings 17 and 18 in order to hold them tightly against the stack of laminations 16.

The bearings for motor shaft 11 are provided by a pair of end frames 21 and 22. Thus, in this instance, the stationary part of the ball bearing structures 23 and 24 are fastened inside of inwardly directed flanges 25, 26 of the frames 21 and 22. These frames are joined to the members 17 and 18 as by the aid of screws or bolts 27. They may also be provided with feet 28 adapted to be fastened to any appropriate support. Pockets 29 and 30 are shown provided back of the bearings 23 and 24 for retaining oil or other lubricant for the bearings.

In order to conduct ventilating air streams inside the motor housing formed by elements 17, 18, 19, 21, and 22, I provide a bell mouth 31 on each of the end frames 21 and 22. This bell mouth is directed downwardly and is widened out so as to extend for a considerable distance on each side of the center line of the frames 21 and 22. Thus a narrow air passage way is provided between the overhanging lip 32 of the bell mouth and the inwardly directed lip 33 of the lower portion of the frame. The air thus passes in the direction indicated by the arrows into each frame 21 and 22, and is directed centrally of the motor by the aid of baffles 34. These are generally conical in shape, and are shown converging inwardly, and surrounding the shaft 11.

The end rings 13 and 14 can be provided with a plurality of fan blades such as 35 for urging this current of air from the central portion of the casing outwardly past the outer surface of the deflectors 34 as well as past the projecting end of the coils 15. Thence the air streams can pass through apertures 39, through members 17 and 18 and can circulate in the space back of the laminations 16, and between these laminations and member 19. They can finally find their exit through the louvres 36 and 37 formed in the sheetmetal cover section 19, near the base of the motor. The path of the air from the outside of baffles 34 can be provided in any desired way; the important point is that the stream passes around the coil ends of winding 15, and around substantially the entire peripheral surface of laminations 16.

It is evident that the streams of air going through the openings formed between the lips 32 and 33 winds in and out of the baffle or deflector members 34 and are urged by the rotation of the blades 35 outwardly past winding 15, and finally into the space between the laminations 16 and the frame 19. Since the mouth formed between the lips 32 and 33 is directed downwardly, foreign objects cannot readily find their way inside the motor casing even if the motor be used in exterior locations. The casing is also weather proof, as it will shed moisture without permitting it to enter inside the casing.

In some instances the louvres 36 and 37 can be dispensed with, especially if the motor is supported in spaced relation to a base, such spaced relation forming an opening from the inside to the outside of the casing.

I have also shown a connection box 38 supported on the member 19 at one side of the motor.

In Fig. 4 I show a motor similar to that of Fig. 1, except that the fan blades 40 are shown as extending over the ends of the coils 15. These blades can be formed on a ring 41 fastened as by screws 42 to end rings 13, 14. In this case also, there is a bell mouth 31 at each end of the motor, so that air is taken in at both ends and combined in the space 43 between the sheet metal cover 19 and laminations 16.

In assembling either form of the motor, laminations 16 are first assembled with clamping rings 17, 18, as by rivets; and then the sheet metal casing 19 is attached to these rings, holes for screws to hold the casing 19 being drilled to fit the casing.

I claim:

1. In a ventilated dust proof horizontal motor, an outer stationary winding member having a stack of laminations and coils, a rotary winding member, said rotary member having a shaft, a casing encompassing the outer member and defining with a major portion of the outer periphery of said member, a space extending substantially around the stationary member, said casing being closed except for a downwardly directed opening at each end, as well as one or more downwardly directed openings in that wall of the casing which defines the space, and means whereby air is drawn in at both of the end openings, passed directly into said space, and out through said wall.

2. In a ventilated dust proof horizontal motor, an outer stationary winding member having a stack of laminations and coils, a rotary winding member, said rotary member having a shaft, a casing encompassing the outer member and defining with a major portion of the outer periphery of said member, a space extending substantially around the stationary member, said casing being closed except for a downwardly directed opening at each end, as well as one or more downwardly directed openings in that wall of the casing which defines the space, a pair of fans, respectively adjacent the ends of the housing, and a deflector for each fan for directing air past each fan directly into the said space and out through said wall.

3. In a ventilated dust proof horizontal motor, an outer stationary winding member having a stack of laminations and coils, a rotary winding member, said rotary winding member having a shaft, a casing encompassing the outer member and defining with a major portion of the outer periphery of said member, a space extending substantially entirely around the stationary member, said casing being closed except for a downwardly directed opening at each end, as well as one or more side openings in the casing leading downwardly from the lower part of the said space, and a pair of fans, respectively adjacent the end openings to draw in air through each of said openings, directly to the space and out through the side openings.

4. In a ventilated motor having a stator provided with coils having end turns, a rotor, and end bells each having a downwardly directed opening, means forming the sides of the motor, and having downwardly directed louvres at each side, said casing being removable to provide either an open or a closed type motor, and a fan structure on each end of the rotor for urging streams of air in through the end bell openings, over and around the end turns of the coils, over and around the stator, and out through the louvres.

GEORGE T. PFLEGER.